106. COMPOSITIONS, COATING OR PLASTIC
84

Cross Reference 822,600 Examiner

UNITED STATES PATENT OFFICE.

THOMAS P. GOURLEY, OF NEW YORK, N. Y.

FIRE-BRICK COMPOUND.

No. 822,600.  Specification of Letters Patent.  Patented June 5, 1906.

Application filed February 28, 1906. Serial No. 303,352.

*To all whom it may concern:*

Be it known that I, THOMAS P. GOURLEY, a citizen of the United States, residing in the borough of Brooklyn, city of New York, county of Kings, State of New York, have invented a new and useful Fire-Brick Compound, of which the following is a specification.

This invention relates to a fire-brick compound for manufacturing bricks, lining furnaces, crucibles, walls, and floors of buildings.

One of the principal objects of my invention is for manufacturing bricks which will stand a greater heat and be lighter in weight than the fire-bricks now in use.

Said invention consists of powdered carborundum or carbid of silicon, which is produced by melting sand and carbon together in an electric furnace. It is characterized by extreme hardness and is used for abrasive purposes as a substitute for emery and corundum. I mix with the carborundum sufficient water to render the compound plastic and also sufficient silicate of soda to bind the carborundum; sulfuric acid in a diluted form being added to render the compound better adapted for its purpose.

In practice I find that carborundum possesses in itself binding qualities, but not of sufficient cohesiveness to render the compound serviceable when the only other ingredient in the compound is water. A brick made from a compound of carborundum and water when subjected to the action of heat becomes hard only on the outside surface. The inside does not adhere sufficient to allow the brick to stand a sufficient strain to render the brick practical, where in my compound the addition of silicate of soda serves to bond the carborundum firmly together and the sulfuric acid serves as a flux for the silicate of soda and aids in more thoroughly amalgamating the ingredients of the compound.

The present invention consists of a compound which can also be supplied in liquid form and may be used for covering bricks and other materials with a covering of the compound, thereby rendering them fireproof. Carborundum can only be melted at extremely high temperatures, the electric furnace being required for the purpose. It follows that the temperatures ordinarily generated for smelting of ores and metals are much below its fusing-point.

A compound made up into a paste in accordance with my invention can be supplied by means of a brush or otherwise to the bricks which are intended to be used for building a furnace or those bricks can be immersed in the viscid liquid for about five hours, and if a coating of about one-sixteenth of an inch of the compound is applied to the bricks it will protect the bricks from the attack of the highest temperature which is ever produced by combustion methods in ordinary work.

In the practice of my invention I use the following ingredients combined in about the proportions stated—namely, carborundum, eighty per cent.; silicate of soda, sixteen and one-half per cent.; water, three and one-quarter per cent.; sulfuric acid, one-quarter of one per cent. The sulfuric acid is diluted to the following proportions—namely, sulfuric acid, twenty-five per cent.; water, seventy-five per cent. These ingredients when thoroughly mixed are then in a condition to be molded into any form desired.

In the manufacture of bricks from my compound the compound is placed in the mold and pressed into the shape and size of the brick required. Then the brick is placed in an oven which is heated to a temperature of about 100° Fahrenheit for about thirty minutes. Then raise the temperature up to about 200° Fahrenheit for thirty minutes. The brick is then in a condition to be handled without breaking or disintegrating. The brick is now taken from the oven and placed in a furnace which is heated to a temperature of 1,000° Fahrenheit, and it remains in the furnace about two hours, when it is taken out, allowed to cool off, and is then ready for use and shipment.

A new and valuable use for my compound is lining furnaces and cupolas. The operation of lining a furnace is as follows: The compound being in a plastic state, I insert into the furnace or cupola a collapsible mold or pattern, the proper size to allow a sufficient thickness of the compound to be rammed between the casing of the furnace or cupola and the outside of the mold or pattern. The compound is then rammed in the space between the pattern and the casing of the furnace or cupola. When the required thickness and height is attained, the pattern is withdrawn and a fire is started and kept at a temperature of about 200° Fahrenheit until all the water has evaporated from the compound. The temperature is then raised to about 1,000° Fahrenheit and kept at that temperature until the compound is red-hot. As soon as the compound becomes red-hot the furnace or cupola is ready for use. When a furnace or cupola is to be lined with brick made in accordance with my invention, the compound in its plastic state is used for cementing the bricks together when the bricks are being laid in tiers in the furnace. After the furnace or cupola has been lined with bricks made from my compound and they have been cemented together with the compound in its plastic state a fire is started in the furnace or cupola at a temperature of about 200° Fahrenheit and kept at that temperature for about thirty minutes. Then the temperature is raised to about 1,000° Fahrenheit, when the whole lining becomes one solid mass of tough and hard fire-brick.

My compound is not only useful for making bricks, crucibles, lining furnaces and cupolas, but also for use in making fireproof floors in the large office-buildings and other structures. Laws regarding the construction of buildings in the large cities require all structures above a stated height to be built fireproof—that is to say, they must be constructed with walls of brick, stone, or iron, and the floors and partitions must be made of fireproof fire-brick. The fire-brick in use at the present time is very heavy, and it is necessary to have much larger and stronger girders and beams to stand the great weight of the fire-brick in the floors and partitions. The fire-brick made from my compound is lighter in weight and stronger than the brick fire-brick in present use and will stand a greater heat without any material expansion or contraction.

Having thus described my invention, I claim—

1. A fire-brick compound comprising carbid of silicon, water, silicate of soda and an acid.

2. A fire-brick compound comprising carbid of silicon, mixed with water, silicate of soda, and sulfuric acid.

3. A fire-brick compound comprising carborundum, water, silicate of soda and an acid.

4. A fire-brick compound comprising carborundum, silicate of soda for bonding the particles of the carborundum together an acid which serves as a flux for said silicate of soda, and water for making the compound plastic.

5. A fire-brick compound comprising carborundum, silicate of soda, water and a flux.

6. A fire-brick compound comprising carborundum, silicate of soda, water and sulfuric acid which serves as a flux for said silicate of soda.

7. A fire-brick compound comprising carborundum mixed with silicate of soda about the proportions of eighty per cent. of carborundum, sixteen and one-half per cent. of silicate of soda, a flux and sufficient water to render the compound plastic.

8. A fire-brick compound comprising carbid of silicon and silicate of soda mixed with sufficient water to render the mixture plastic and with sufficient sulfuric acid to serve as a flux for said silicate of soda.

9. A fire-brick compound comprising carborundum, sulfuric acid, water and a bond.

10. A fire-brick compound comprising carborundum, silicate of soda, water and sulfuric acid in the following proportions by weight, namely: about eighty pounds of carborundum, about sixteen and one-half pounds of silicate of soda, about three and one-half pounds of water and one-quarter pound of sulfuric acid.

11. A fire-brick compound comprising carbid of silicon, mixed with water, sulfuric acid and a bond.

12. A fire-brick compound comprising carborundum, a fluxing acid, sufficient water to render the compound plastic, and a bond.

13. A fire-brick compound comprising carbid of silicon mixed with silicate of soda, a fluxing acid which serves to flux said silicate of soda, and sufficient water to render the mixture plastic, said compound being bonded in a solid mass when subjected to the action of heat.

14. A fire-brick compound comprising carborundum, silicate of soda which serves as a bond, sulfuric acid or its equivalent, which serves as a flux for said silicate of soda, and water which renders the mixture plastic.

THOMAS P. GOURLEY.

Witnesses:
ABRAHAM ARUPOLSS,
HELEN ZURICH.